US012671186B2

(12) United States Patent
Mueller et al.

(10) Patent No.: US 12,671,186 B2
(45) Date of Patent: Jun. 30, 2026

(54) ANTENNA ARRANGEMENT FOR RADIATING A HIGH-FREQUENCY MEASUREMENT SIGNAL OF A MEASURING SENSOR

(71) Applicant: VEGA Grieshaber KG, Wolfach (DE)

(72) Inventors: Christoph Mueller, Oppenau (DE); Christian Weinzierle, Wolfach (DE); Steffen Waelde, Niedereschach (DE)

(73) Assignee: VEGA Grieshaber KG, Wolfach (DE)

( * ) Notice: Subject to any disclaimer, the term of this patent is extended or adjusted under 35 U.S.C. 154(b) by 287 days.

(21) Appl. No.: 18/334,851

(22) Filed: Jun. 14, 2023

(65) Prior Publication Data

US 2023/0402761 A1 Dec. 14, 2023

(30) Foreign Application Priority Data

Jun. 14, 2022 (EP) ..................................... 22178924

(51) Int. Cl.
| | |
|---|---|
| *H01Q 1/12* | (2006.01) |
| *H01Q 13/02* | (2006.01) |
| *H04B 17/30* | (2015.01) |

(52) U.S. Cl.
CPC ........... *H01Q 13/0283* (2013.01); *H01Q 1/12* (2013.01); *H04B 17/30* (2015.01)

(58) Field of Classification Search
CPC ....... H01Q 13/0283; H01Q 1/12; H04B 17/30
See application file for complete search history.

(56) References Cited

U.S. PATENT DOCUMENTS

| | | | |
|---|---|---|---|
| 3,530,481 A | 9/1970 | Tanaka et al. | |
| 3,566,317 A * | 2/1971 | Hafner | H01B 11/1895 |
| | | | 343/705 |

(Continued)

FOREIGN PATENT DOCUMENTS

| | | |
|---|---|---|
| AU | 2186702 A | 5/2002 |
| CN | 102544737 A | 7/2012 |

(Continued)

OTHER PUBLICATIONS

Extended European Search Report issued on Nov. 7, 2022 in European Patent Application No. 22178924.1 (with English translation of category of cited documents), 11 pages.

(Continued)

*Primary Examiner* — Graham P Smith
(74) *Attorney, Agent, or Firm* — Oblon, McClelland, Maier & Neustadt, L.L.P.

(57) ABSTRACT

An antenna arrangement configured to radiate a high-frequency measurement signal from a measurement sensor is provided, including: an antenna made of a plastic material; a waveguide made of the plastic material, in which the waveguide is integrally formed with the antenna; and a wall on an outside of the antenna that has metallization or is made of metal. A measuring device including a measurement sensor and the antenna arrangement is also provided. A method of manufacturing an antenna arrangement is also provided, the method including: providing an antenna arrangement having an antenna and a waveguide made of a plastic by an injection molding process, a micro injection molding process, a compression molding of a base body, or a 3D printing process, in which the waveguide is integrally formed with the antenna; and metallizing an exterior of the antenna to form a wall on the exterior of the antenna.

16 Claims, 3 Drawing Sheets

(56) References Cited

U.S. PATENT DOCUMENTS

| | | | | |
|---|---|---|---|---|
| 6,661,389 B2 * | 12/2003 | Griessbaum | ........... | H01Q 13/02 |
| | | | | 343/873 |
| 2002/0021256 A1 | 2/2002 | Yuanzhu et al. | | |
| 2002/0126061 A1 * | 9/2002 | Griessbaum | ........... | H01Q 13/02 |
| | | | | 343/786 |
| 2007/0008212 A1 | 1/2007 | Serban et al. | | |
| 2013/0057366 A1 * | 3/2013 | Wegemann | ............ | H01Q 13/02 |
| | | | | 333/239 |
| 2020/0243980 A1 | 7/2020 | Kienzle et al. | | |
| 2022/0049984 A1 | 2/2022 | Winfried et al. | | |

FOREIGN PATENT DOCUMENTS

| | | | |
|---|---|---|---|
| DE | 199 50 429 A1 | 4/2001 | |
| DE | 100 57 441 A1 | 5/2002 | |
| DE | 10 2019 104 682 A1 | 8/2020 | |
| DE | 10 2021 118 496 A1 | 1/2023 | |
| DE | 10 2021 131 501 A1 | 6/2023 | |
| EP | 2 565 596 A1 | 3/2013 | |
| EP | 3 686 567 A1 | 7/2020 | |
| EP | 3 872 927 A1 | 9/2021 | |
| WO | WO 90/13927 A1 | 11/1990 | |
| WO | WO 2020/120059 A1 | 6/2020 | |

OTHER PUBLICATIONS

European Office Action issued May 3, 2024 in European Application No. 22 178 924.1, 30 pgs.
Combined Chinese Office Action and Search Report issued Oct. 12, 2025, in corresponding Chinese Patent Application No. 202310702084.2 (with English Translation of Category of Cited Documents), 7 pages.

* cited by examiner

ANTENNA ARRANGEMENT FOR RADIATING A HIGH-FREQUENCY MEASUREMENT SIGNAL OF A MEASURING SENSOR

CROSS-REFERENCE TO RELATED APPLICATIONS

This application claims the benefit of priority under 35 U.S.C. § 119 from European Patent Application No. 22 178 924.1 filed on 14 Jun. 2022, the entire content of which is incorporated herein by reference.

TECHNICAL FIELD

The invention relates to the antenna arrangement configured for radiating a high-frequency measurement signal of a measurement sensor, a measuring device, the use of an antenna arrangement for transmitting a high-frequency measurement signal and/or receiving a reflected measurement signal for determining a level, a limit level or a pressure, the use of a measuring device for level measurement, limit level measurement, or pressure measurement in a process plant, and a method for manufacturing an antenna arrangement arranged for radiating a high-frequency measurement signal of a measurement sensor.

TECHNICAL BACKGROUND

Radar devices are often used as field devices in level, point level, and pressure measurement technology or in production automation. A measuring beam is emitted from an excitation element or a signal source of the radar devices by a transmitter and/or receiver unit. The measuring beam can be transmitted, for example, by means of a rigid metallic waveguide from the signal source to the transmitting and/or receiving unit.

SUMMARY

It is an object of the present invention to provide an alternative transmitting and/or receiving device for a field device.

This object is solved by the features of the independent patent claim. Further embodiments of the invention result from the dependent patent claims and the following description of embodiments.

A first aspect of the present disclosure relates to an antenna arrangement configured to radiate a radio frequency measurement signal from a measurement sensor, comprising an antenna made of a plastic and a waveguide made of the plastic. The waveguide is integrally formed with the antenna. Furthermore, the antenna arrangement further comprises a wall on the outside of the antenna, comprising a metallization. The wall can be made of plastic or of metal, and in particular of the same metal as the "metallization", in which case it can be formed as a metal housing without a separate metallization layer.

The measurement sensor can be, for example, a level, a limit level, and/or a pressure measurement sensor for a process plant, which can operate with a high-frequency measurement signal with a frequency greater than 70 GHz or greater than 100 GHz. Advantageously, the measurement sensor with the high-frequency measurement signal can have low signal attenuations at the frequency >100 GHz compared to a conventional waveguide. Furthermore, such a measurement sensor can have a galvanic isolation between the sensor electronics and the antenna, whereby the galvanic isolation can also serve as a temperature decoupling between the sensor electronics and the antenna.

The antenna arrangement may be a plastic antenna arrangement, which may be partially metallized on the outside. This means that the antenna arrangement can be integrally formed with the waveguide as a basic body and a metal coating can be applied subsequently to the outside of the section of the antenna.

The waveguide or feeder may be a plastic waveguide, which may be made of a dielectric material. This plastic waveguide may also have a metallic wall. Compared to a waveguide, the waveguide may be filled with the dielectric material.

The waveguide can be set up to feed or couple the high-frequency measurement signal from a measurement sensor and to guide the measurement signal to the antenna. Advantageously, with the antenna integrally formed with the waveguide, a coupling point between the antenna and the waveguide can be eliminated, and thus reflections and attenuations at the coupling point and at the transition between the antenna and the waveguide can be reduced or minimized. In other words, the sensitivity of a measurement system, for example a radar system, can be minimized with the antenna arrangement and the stability of the measurement system can be improved accordingly. This may be particularly advantageous for a measurement system with a high operating frequency, for example greater than 100 GHz, and with a relatively long waveguide with a relatively small diameter.

The antenna assembly may be partially metallized on the outside of the antenna. The metallized wall of the antenna may serve to reduce or minimize the susceptibility to interference from an object located in close proximity to the waveguide that may cause spurious echoes and increased antenna ringing.

According to an embodiment, the antenna is a horn antenna or a parabolic antenna.

According to another embodiment, the antenna is cone-shaped.

According to a further embodiment, the antenna arrangement further comprises an anti-reflection element arranged on an outer side of a transition region between the antenna and the waveguide and arranged to reduce reflections of the measurement signal in the transition region.

By forming the one-piece antenna assembly with the filled antenna horn and the integrated feed waveguide, the transition in the transition region between the waveguide and the antenna horn can be optimized for signal transmission by allowing the anti-reflection element, which may be disposed in the transition region, to scatter reflections of the measurement signal at the transition point away toward the anti-reflection element.

According to a further embodiment, the anti-reflection element is funnel-shaped.

In order to realize the transition between the waveguide and the antenna with the lowest possible reflection, the metallic funnel can be provided in the transition area.

According to another embodiment, the anti-reflective element is a metallic funnel partially filled with the plastic.

According to another embodiment, the plastic is a dielectric material made of polyetheretherketone (PEEK), polyethylene (HDPE), polytetrafluoroethylene (PTFE), perfluoroalkoxy (PFA), or polyvinylidene fluoride (PVDF).

Since the antenna and the waveguide can be formed in one piece, the plastic as the dielectric filling material of the antenna arrangement can be identical for the antenna and the waveguide. Furthermore, the filling of the metallic funnel can be made of the same filling material.

According to another embodiment, the plastic has a DK value of $2 \leq \varepsilon_r \leq 5$ and a loss factor of $0.1 \leq \tan(\delta) \leq 0.00001$.

The plastic for filling the antenna array with the high working frequency can be process suitable for the measuring device or measuring system with the relatively low value of dielectric constant (DK value) and loss factor. Process-suitable means that the plastic can withstand high process temperatures and exhibit resistance to various chemicals. Such a plastic can be, for example, a dielectric material such as PEEK, HDPE, PTFE, PFA, or PVDF.

Another aspect relates to a measurement device comprising a measurement sensor having a radar chip arranged to generate and/or detect a radio frequency measurement signal, and an antenna arrangement having an antenna and a waveguide arranged to radiate the radio frequency measurement signal from the measurement sensor.

The measuring device can be a stand-alone measuring device that has an internal energy supply, such as a battery, accumulator, energy harvesting system, or solar cell. Such a measuring device can be advantageously used for monitoring level, limit level, or pressure values in the field of process automation in industrial or private environments such as logistics.

The term "process automation in industrial or private environments" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping, or mining industries. A wide range of sensors can be used for this purpose, which are adapted in particular to the specific requirements of the process industry, such as mechanical stability, insensitivity to contamination, extreme temperatures, and extreme pressures. Measured values from these sensors are usually transmitted to a control room, where process parameters such as level, limit level, flow rate, pressure, or density can be monitored and settings for the entire plant can be changed manually or automatically.

One area of process automation in the industrial environment is logistics automation. In the field of logistics automation, distance and angle sensors are used to automate processes within a building or within an individual logistics facility. Typical applications include systems for logistics automation in the area of baggage and freight handling at airports, in the area of traffic monitoring (toll systems), in retail, parcel distribution, or in the area of building security (access control). What is meant in the examples listed above is that presence detection in combination with precise measurement of the size and location of an object is required by the respective application side. Sensors based on optical measurement methods using lasers, LEDs, 2D cameras, or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry, or generally in the field of packaging. The goal of factory automation is to automate the production of goods by machines, production lines, and/or robots, i.e., to let it run without the involvement of humans. The sensors used in this process and the specific requirements with regard to measuring accuracy when detecting the position and size of an object are comparable to those in the previous example of logistics automation.

For example, the continuous, automated monitoring of fill levels in mobile containers and the preferably wireless transmission of the values to a central evaluation point in the area of goods logistics can be used to implement cross-location inventory management in a simple manner. Using the recorded data, significant cost reductions can be achieved depending on the particular problem, for example if the route for delivery vehicles to supply replenishments can be optimized.

With the one-piece antenna arrangement of the meter, only a single coupling point can be provided in the complete transmission path of the high-frequency measurement signal, between the radar chip and the free end of the waveguide or feed line of the antenna.

According to an embodiment, the meter further comprises a housing in which the antenna arrangement is mounted. The housing comprises a mounting bracket provided in the housing and adapted to mount the antenna arrangement in the housing.

The antenna arrangement with the antenna and the integrated waveguide can advantageously be held and mounted in the housing or the sensor housing in an advantageous manner, so that the transition between the waveguide and the antenna for transmitting the measurement signal can be optimized by the holder.

Mechanical contact of the housing to the metallized areas of the horn antenna cannot influence the high-frequency signal.

According to a further embodiment, the housing is adapted to arrange the antenna arrangement in the housing by means of the holder in such a way that the high-frequency measurement signal from the radar chip of the measurement sensor is coupled into the waveguide and guided from the waveguide to the antenna.

A lens may be provided between the radar chip and the waveguide of the antenna arrangement, which may be arranged to radiate the measurement signal from the radar chip of the measurement sensor to the waveguide in a focused manner and to feed or couple the measurement signal into the waveguide.

According to a further embodiment, the measurement sensor further comprises a printed circuit board on which the radar chip is arranged. The housing is adapted to arrange the printed circuit board and the radar chip directly at a free end of the waveguide of the antenna arrangement by means of the holder.

The printed circuit board may be adapted to receive the radar signal source or the radar chip and to adaptively and directly arrange the antenna array. Thus, another coupling point between the radar chip and the waveguide of the filled horn antenna array can be omitted and the reflections during signal transmission can be further reduced.

According to a further embodiment, the holder is sleeve-shaped.

Alternatively, the holder may be formed in a further shape corresponding to the internal shape of the housing.

According to another embodiment, the holder is a thrust holder and is configured such that an anti-reflective element of the antenna array, which is disposed on an outer side of a transition region between the antenna and the waveguide, can be slid through in the thrust holder.

For example, the inner diameter of the sleeve-shaped holder may be selected to be large enough to allow the funnel-like structure to pass through in the transition region from the waveguide to the horn antenna.

The pressurizer can be of any length if, for example, a high-pressure load on the antenna array is required.

According to a further embodiment, the holder is provided in the housing in a front region of the antenna for holding the antenna arrangement. Alternatively, the holder is provided in the housing in a rear area of the antenna for holding the antenna arrangement.

Alternatively, the pressurizer can be located only in the front area in order to take advantage of the transfer of occurring temperatures, for example from outside the antenna, to the subsequent electronics.

According to another embodiment, the holder is made of a metal or a plastic.

The contact point of the pressure holder or the pressure piece can be provided in the area of the metallized antenna in such a way that the high-frequency measurement signal cannot be influenced during transmission into the waveguide and during radiation in the direction of a target object and reception after reflection.

According to another embodiment, the operating frequency of the high-frequency measurement signal is greater than 70 GHz, 120 GHz, or 200 GHz.

Another aspect relates to the use of an antenna arrangement for transmitting a radio frequency measurement signal and/or receiving a reflected measurement signal for determining a level, a limit level or a pressure.

Another aspect relates to the use of a measuring device for level measurement, point level measurement, or pressure measurement in a process plant.

Another aspect relates to a method of manufacturing an antenna arrangement arranged to radiate a radio frequency measurement signal from a measurement sensor. The method comprises the steps of: providing an antenna arrangement comprising an antenna and a waveguide made of a plastic by an injection molding process, a micro injection molding process, a compression molding of a base body, or a 3D printing process. The waveguide is integrally formed with the antenna. The method further comprises the step of metallizing the outside of the antenna to form a wall on the outside of the antenna.

According to a further embodiment, the method further comprises the step of: providing an anti-reflection element on an outside of a transition region between the antenna and the waveguide to reduce reflections of the measurement signal in the transition region.

In a measuring system or a measuring device with a high operating frequency, it may be that the production of a funnel-shaped metallic horn antenna, as may be provided in a level meter with a low frequency (<100 GHz) of the measuring signal, can be technically complex due to a significantly smaller design and the long horn antennas, which can have a negative effect on the manufacturing costs. At a lower frequency, for example, the funnel-shaped horn antenna can be machined as a turned part. This horn antenna can often be filled with a twisted plastic cone at a lower frequency to obtain a shortened design and compressive strength. The machining production of these parts can be replaced by the injection molding process, the micro injection molding process, the compression molding of a base body, or a 3D printing process for a measuring device at high working frequencies due to the small diameter of the antenna and the waveguide. Alternatively, the antenna together with the feed waveguide can be manufactured mechanically by turning or milling if the working frequency and the mechanical dimensional accuracies required with it can allow mechanical processing. For example, this may be feasible at a frequency of <100 GHz, in particular from 70

GHz to 100 GHz. At very high operating frequencies, in particular >120 GHz or >200 GHz, especially 122.5 GHz of an ISM band, the arrangement can be manufactured by (micro)injection molding, by pressing the base body of the antenna arrangement, or by means of 3D printing technology.

Thus, the antenna assembly may be formed integrally, or integrally with the antenna and the waveguide. The metallic horn of the radar antenna can be formed by the partial metallization of the base body. A mechanical bond of the metallic wall of the horn of the antenna and the plastic filling can already be executed by the partial metallization of the outer side of the base body.

The manufacture of the horn antenna with the waveguide can therefore be very cost-effective to realize. In addition, it is not necessary to join the metallic horn of the antenna and the filling, since the horn of the antenna can be formed by metallizing the filling cone with a metallic wall.

In the following, embodiments of the present disclosure are described with reference to the figures. If the same reference signs are used in the figure description, these describe the same or similar elements. The illustrations in the figures are schematic and not to scale.

DETAILED DESCRIPTION OF EMBODIMENTS

Figures 1A, 1B:
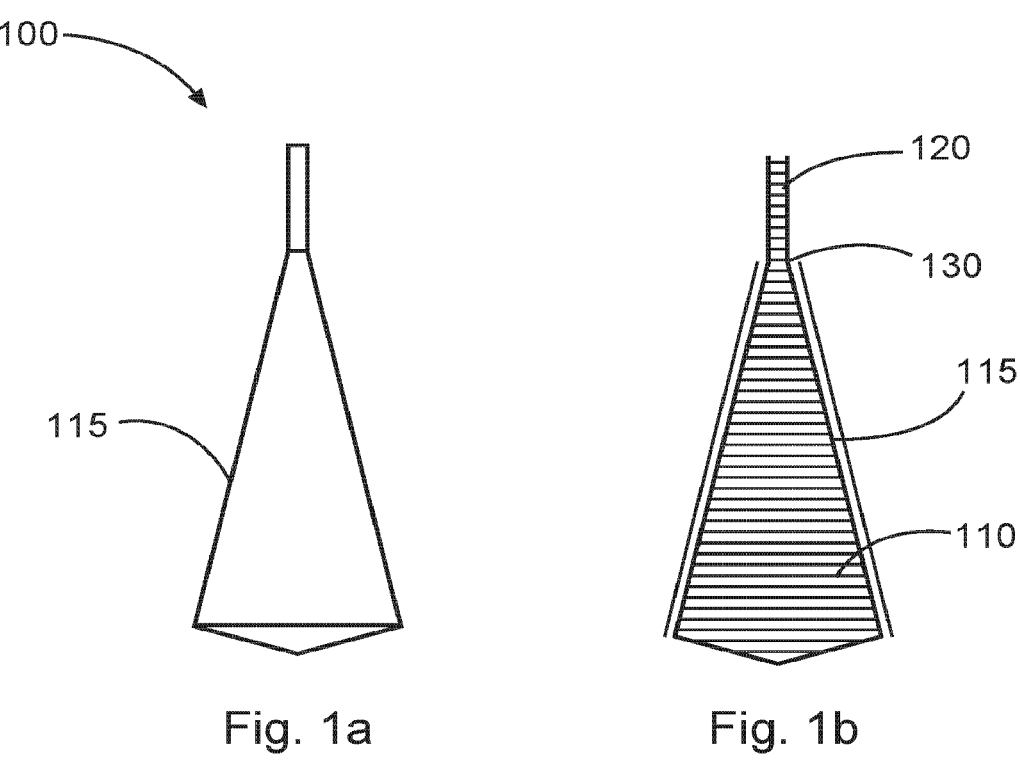
FIG. 1a schematically shows an antenna arrangement according to an embodiment.
FIG. 1b schematically shows an antenna arrangement according to a further embodiment.

FIG. 1a and FIG. 1b each schematically show an antenna arrangement 100 configured to radiate a radio frequency measurement signal from a measurement sensor 200. The antenna arrangement includes an antenna 110 made of a plastic and a waveguide 120 made of the plastic and integrally formed with the antenna 110.

The antenna arrangement 100 further comprises a wall 115 on the outside of the antenna 110, which has a metallization or is in the form of a metal housing.

The antenna 110 in FIGS. 1a and 1b is a ham antenna. The antenna 110 may be cone-shaped. Alternatively, the antenna 110 may be a parabolic antenna.

The antenna 110 may be integrally formed with the waveguide 120 of the same plastic, wherein the waveguide 120 is cylindrical in shape. A transition region 130 is disposed between the antenna 110 and the waveguide 120.

The plastic can be a dielectric material made of PEEK, HDPE, PTFE, PFA, or PVDF. In addition, the plastic may have a DK value of $2 \leq \varepsilon_r \leq 5$ and a dissipation factor of $0.1 \leq \tan(\delta) \leq 0.00001$.

FIG. 1a shows the metallized wall 115 on the outside of the antenna 110 of the antenna arrangement 100.

FIG. 1b shows a sectional view of the antenna arrangement 100, which may have an inner filling of the plastic, in that the antenna 110 and the waveguide 120 may be integrally formed from a common plastic in the form of the filling. Thus, the outer wall 115 of the antenna arrangement 100 may be partially metallized up to the transition region 130. The outer surface of the waveguide 120 may further comprise the plastic without a metallized wall.

Figures 2A, 2B:
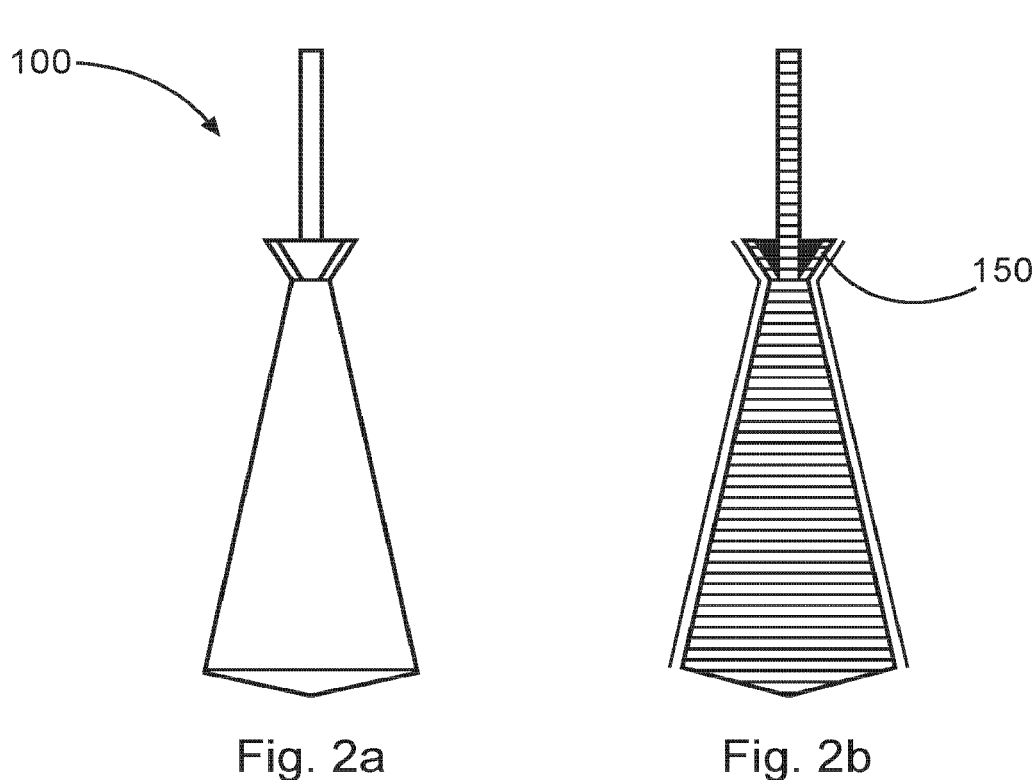
FIG. 2a schematically shows an antenna arrangement according to an embodiment.
FIG. 2b schematically shows an antenna arrangement according to a further embodiment.

FIG. 2a and FIG. 2b respectively show the antenna arrangement 100 further comprising an anti-reflection element 150 arranged on an outer side of a transition region 130 between the antenna 110 and the waveguide 120. The anti-reflection element 150 is arranged to reduce reflections of the measurement signal in the transition region 130.

The anti-reflective element 150 is funnel-shaped.

FIG. 2a shows that the anti-reflection element 150 is a metallic funnel. Thus, the antenna arrangement 100 may have a metallic wall on the outside of the antenna 110 and the anti-reflection element 150.

FIG. 2b shows that the anti-reflection element 150 may be partially filled with the plastic. For example, the anti-reflection element 150 may be integrally formed with the antenna 110 and the waveguide 120 as one body. The wall of the antenna 110 and the anti-reflection element 150 may be formed by the partial metallization on the outer surface of the base body, in that a metal coating may be applied to the outer surface.

Figures 3A, 3B, 4A, 4B:
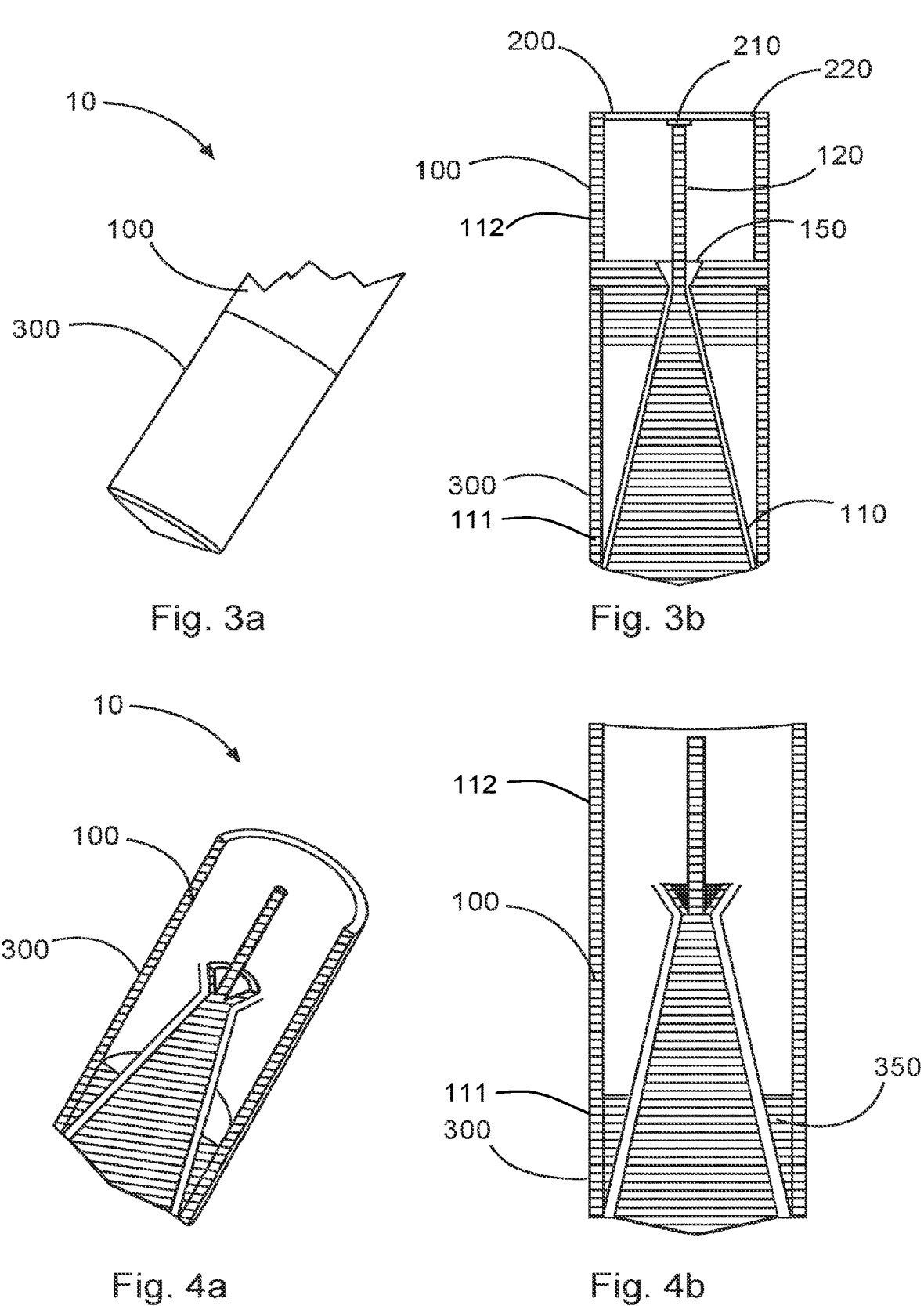
FIG. 3a schematically shows a measuring device according to an embodiment.
FIG. 3b schematically shows a measuring device according to a further embodiment.
FIG. 4a schematically shows a measuring device according to an embodiment.
FIG. 4b schematically shows a measuring device according to a further embodiment.

FIG. 3a shows a measuring device 10 comprising an antenna arrangement 100, a measuring sensor 200 comprising a radar chip 210 arranged to generate and/or detect a radio frequency measuring signal, and a housing 300.

FIG. 3b shows that the antenna arrangement 100, which includes an antenna 110, a waveguide 120, and an anti-reflection element 150, is mounted in the housing 300 and arranged to radiate the radio frequency measurement signal. The measurement sensor 200 may further comprise a printed circuit board 220 on which the radar chip 210 may be disposed.

The housing 300 includes a mounting bracket 350 provided in the housing 300 and adapted to secure the antenna assembly 100 in the housing 300.

The housing 300 is adapted to arrange the antenna arrangement 100 in the housing 300 by means of the mounting bracket 350 such that the measurement signal from the radar chip 210 of the measurement sensor 200 can be coupled into the waveguide 102 and guided from the waveguide 102 to the antenna 101. For example, the circuit board 220 may be arranged directly at a free end of the waveguide 120 of the antenna arrangement 100. To this end, the circuit board 220 may be configured or adapted such that the radar chip may be provided directly at the free end of the waveguide 120. Furthermore, the housing 300 may be adapted to secure the printed circuit board 220 with the radar chip 210 in the housing by means of the mounting bracket 350.

By directly arranging the radar chip 210 of the measurement sensor 200 on the waveguide 120 of the antenna arrangement 100, a single coupling point can be provided in the complete radar signal path, namely between the radar chip 210 and the waveguide 120. Thus, further coupling points, for example between the waveguide 120 and the filled horn antenna 110, can advantageously be omitted and few reflections can be generated in the measuring device 10.

The holder can be made of a metal or a plastic.

The mounting bracket 350, also called a holder or a support, of the housing 300 may be formed in a sleeve shape. Furthermore, the holder 350 may include a pressure retainer and may be formed such that the anti-reflection element 150 of the antenna arrangement 100, which may be disposed on an outer side of a transition region 130 between the antenna 110 and the waveguide 120, may be slid through in the pressure retainer.

As shown in FIG. 3b, the support 350 may be provided in the housing 300 in a rear portion 112 of the antenna 110 or in the transition portion 130 of the antenna assembly 110 for supporting the antenna assembly 100.

Alternatively, FIG. 4a and FIG. 4b show that the support 350 may be provided in the housing 300 in a front portion 111 of the antenna 110 for supporting the antenna assembly 100.

Figures 5A, 5B, 5C, 6:
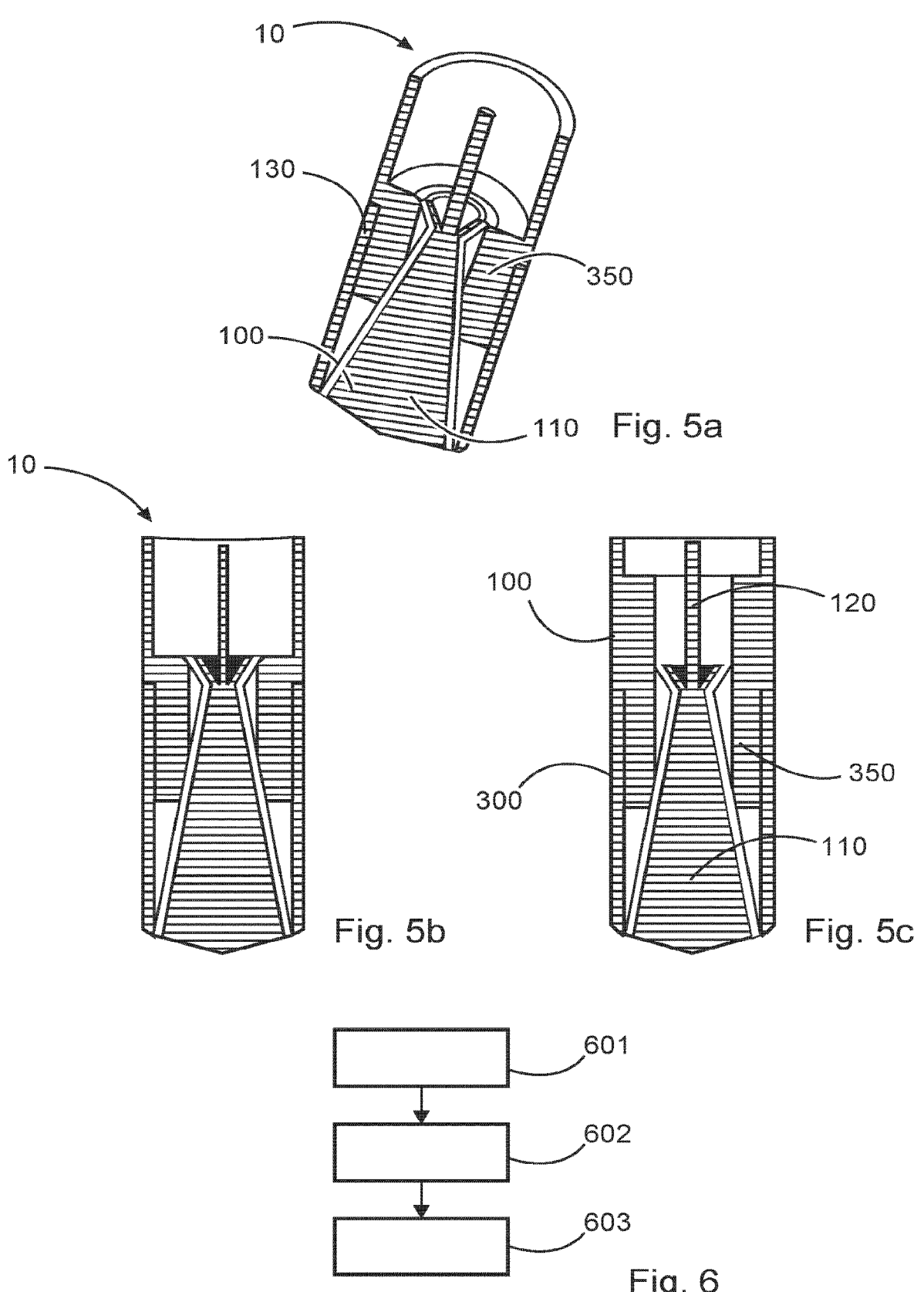
FIG. 5a schematically shows a measuring device according to an embodiment.
FIG. 5b schematically shows a measuring device according to a further embodiment.
FIG. 5c schematically shows a measuring device according to a further embodiment.
FIG. 6 schematically shows a flow diagram of a process for manufacturing an antenna arrangement according to an embodiment.

FIG. 5a, FIG. 5b, and FIG. 5c further show that the holder 350 may be arranged in such a way that the contact point between the holder 350 or the pressure holder and the antenna arrangement 100 in the transition region 130 between the metallized horn filling of the antenna 110 and the waveguide 120 cannot influence the high-frequency measurement signal in the antenna horn. The holder 350 may be formed in different lengths, as shown in FIG. 5a to FIG. 5c.

FIG. 6 schematically shows a flowchart of a method for manufacturing an antenna arrangement 110 arranged to couple a high-frequency measurement signal from a measurement sensor 200. In step 601, an antenna assembly 100 having an antenna 110 and a waveguide 120 made of a plastic is provided by an injection molding process, a micro injection molding process, a compression molding of a base body, or a 3D printing process, wherein the waveguide 120 is integrally formed with the antenna 110. In step 602, the outer surface of the antenna 110 is metallized to form a wall 115 on the outer surface of the antenna 110. Furthermore, in step 603, an anti-reflection element 150 may be provided on an outer surface of a transition region 130 between the antenna 110 and the waveguide 120 to reduce reflections of the measurement signal in the transition region 130.

For this purpose, the antenna 110 together with the feed waveguide 120 can be manufactured mechanically by turning or milling, if the working frequency and the mechanical dimensional accuracies thus required can permit mechanical processing. For example, this may be feasible at a frequency of <100 GHz, in particular from 70 GHz to 100 GHz. At very high operating frequencies, in particular >120 GHz or >200 GHz, in particular 122.5 GHz, the antenna arrangement 100 can be manufactured, for example, by (micro) injection molding, by pressing the base body of the antenna arrangement, or by means of 3D printing technology.

Thus, the antenna arrangement 100 with the antenna 110 and the waveguide 120 may be integrally formed. The metallic horn of the radar antenna 110 may be formed by partially metallizing the base body. A mechanical bond of the metallic wall 150 of the horn of the antenna 110 and the plastic filling can already be executed by the partial metallization of the outer side of the base body.

The production of the horn antenna 110 with the waveguide 120 can therefore be realized at very low cost. In addition, joining the metallic horn of the antenna 110 and the filling can be omitted, since the horn of the antenna can be formed by metallizing the filling cone with a metallic wall 150.

Supplementally, it should be noted that "comprises" and "comprising" do not exclude other elements or steps, and the indefinite articles one or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. An antenna arrangement, configured to radiate a high-frequency measurement signal from a measurement sensor of a measuring device, comprising:

an antenna made of a plastic material;

a waveguide made of the plastic material, wherein the waveguide is integrally formed with the antenna;

a wall on an outside of the antenna that has metallization or is made of metal; and an anti-reflection element configured on an outer side of a transition region between the antenna and the waveguide and being further configured to reduce reflections of the measurement signal in the transition region, wherein the anti-reflection element of the antenna arrangement is configured to be slid through in a bracket, which is a press holder.

2. The antenna arrangement according to claim 1, wherein the antenna is a horn antenna or a parabolic antenna.

3. The antenna arrangement according to claim 1, wherein the antenna is cone-shaped.

4. The antenna arrangement according to claim 1, wherein the anti-reflective element is funnel-shaped.

5. The antenna arrangement according to claim 1, wherein the anti-reflective element is a metallic funnel partially filled with the plastic material.

6. The antenna arrangement according to claim 1, wherein the plastic material is a dielectric material of PEEK, HDPE, PTFE, PFA, or PVDF.

7. The antenna arrangement according to claim 1, wherein the plastic material has a DK value of $2 \leq \varepsilon_r \leq 5$ and a loss factor of $0.1 \leq \tan(\delta) \leq 0.00001$.

8. A measuring device, comprising:

a measurement sensor comprising a radar chip configured to generate and/or detect a high-frequency measurement signal;

the antenna arrangement according to claim 1, wherein the antenna and the waveguide are configured to radiate the high-frequency measurement signal from the measurement sensor; and a housing in which the antenna arrangement is mounted, wherein the housing comprises a bracket provided in the housing and configured to secure the antenna assembly in the housing, and wherein the bracket is a press holder and is formed such that an anti-reflection element of the antenna arrangement, which is disposed on an outer side of a transition region between the antenna and the waveguide, can be slid through in the press holder.

9. The measuring device according to claim 8, wherein the housing is further configured to arrange the antenna arrangement in the housing by means of the bracket in such a way that the high-frequency measurement signal from the radar chip of the measurement sensor is coupled into the waveguide and guided from the waveguide to the antenna.

10. The measuring device according to claim 8, wherein the measurement sensor further comprises a printed circuit board on which the radar chip is disposed, and wherein the housing is further configured to directly mount the circuit board and the radar chip to a free end of the waveguide of the antenna arrangement by means of the bracket.

11. The measuring device according to claim 8, wherein the bracket is sleeve-shaped.

12. The measuring device according to claim 8, wherein the bracket is provided in the housing in a front portion of the antenna for supporting the antenna assembly, or wherein the bracket is provided in the housing in a rear portion of the antenna for supporting the antenna assembly.

13. The measuring device according to claim 8, wherein the bracket is made of a metal or a plastic.

14. The measuring device according to claim 8, wherein an operating frequency of the high-frequency measurement signal is greater than 70 GHz.

15. The antenna arrangement according to claim 1, wherein the antenna arrangement is further configured to transmit the high-frequency measurement signal and/or to receive a reflected measurement signal, for determining a level, a limit level, or a pressure.

16. The measuring device according to claim 8, wherein the measuring device is configured for level measurement, point level measurement, or pressure measurement in a process plant.

\* \* \* \* \*